United States Patent
Otto et al.

(10) Patent No.: US 6,588,558 B2
(45) Date of Patent: Jul. 8, 2003

(54) RELEASE SYSTEM FOR A CLUTCH ASSEMBLY

(75) Inventors: Thomas Otto, Würzburg (DE); Herbert Voit, Schweinfurt (DE); Manfred Wehner, Euerbach (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/977,656

(22) Filed: Oct. 15, 2001

(65) Prior Publication Data

US 2002/0060115 A1 May 23, 2002

(30) Foreign Application Priority Data

Nov. 21, 2000 (DE) ......................................... 100 57 609

(51) Int. Cl.⁷ ............................................... F16D 23/14
(52) U.S. Cl. .................... 192/13 R; 192/98; 192/111 A
(58) Field of Search ............................ 192/13 R, 18 R, 192/70.25, 98, 111 A; 188/196 B

(56) References Cited

U.S. PATENT DOCUMENTS

| | | | |
|---|---|---|---|
| 3,202,247 A | * | 8/1965 | Schmidt et al. ............ 192/13 R |
| 3,912,058 A | | 10/1975 | Parkins ...................... 192/18 A |
| 3,942,617 A | * | 3/1976 | Poon ......................... 192/111 A |
| 4,099,604 A | | 7/1978 | Higgerson .................. 192/111 |
| 4,108,295 A | * | 8/1978 | de Gennes ................ 192/111 A |
| 4,445,600 A | * | 5/1984 | Schmidt ..................... 192/18 R |
| 4,579,203 A | * | 4/1986 | Link ............................. 192/15 |

* cited by examiner

Primary Examiner—Richard M. Lorence
(74) Attorney, Agent, or Firm—Cohen, Pontani, Lieberman & Pavane

(57) ABSTRACT

A release slide is or can be connected to a stored-energy element of the clutch assembly for executing a release movement, and at least one brake element can move along with the release slide during the execution of a release movement, which brake element can be brought into braking interaction with a counter-braking element, which is or can be connected in essentially nonrotatable fashion to a clutch output shaft, where the minimum of one brake element can shift position relative to the release slide at least to compensate for the wear which occurs in the area of the clutch assembly. A latching arrangement includes a set of latching teeth on either the release slide or on the brake element, and a latching element on the other of the brake element and the release slide. The latching arrangement allows relative motion between the release slide and the brake element when wear occurs, but allows essentially no relative motion between the release slide and the brake element when the release slide moves in the release direction and a braking interaction occurs between the minimum of one brake element and the counter-braking element.

7 Claims, 1 Drawing Sheet

RELEASE SYSTEM FOR A CLUTCH ASSEMBLY

BACKGROUND OF THE INVENTION

1. Field of the Invention

The present invention pertains to a release system for a clutch assembly, comprising a release slide, which is or can be connected to a stored-energy element of the clutch assembly to execute the release movement, and at least one brake element, which can be moved along with the release slide during the execution of a release movement. The brake element can be brought into braking interaction with a counter-braking element, which is or can be brought into essentially nonrotatable connection with a clutch output shaft. The position of the minimum of one brake element can be shifted relative to the release slide at least for the purpose of compensating for the wear which occurs in the area of the clutch assembly.

2. Description of the Related Art

A release system is known from U.S. Pat. No. 4,099,604, in which a brake element is movably connected to a release slide, which can slide in the same direction as that in which a clutch rotational axis extends to execute release movements. When a release movement is executed and the clutch has been completely released, the release slide is moved even farther by appropriate actuation, and the brake element is thus pressed against a counter-braking element, connected nonrotatably to a clutch output shaft. As a result, a braking force is exerted on the clutch output shaft and thus on the transmission input shaft. This is advantageous especially when such systems are used in conjunction with unsynchronized transmissions. In order to ensure in an arrangement of this type that, even after the friction linings of the clutch assembly have become worn, the release system and also the brake system provided for the clutch output shaft will still have the same actuating characteristic or working characteristic, a wear compensating mechanism is provided, by means of which a relative displacement occurs between the release slide and the pressure plate upon the occurrence of wear without any change in the original installation position of the stored-energy element. This ensures that the release slide and thus also the braking element will always remain in approximately the same installation position regardless of the amount of wear and that the working characteristics of the braking arrangement for the clutch output shaft will always remain the same during the execution of clutch-release operations.

A release system for a clutch assembly is also known from U.S. Pat. No. 3,912,058, in which a release slide, which can be displaced by the introduction of hydraulic fluid so that it can execute release movements, can also be used to push a brake element to generate a braking force at least in the situation where the release stroke exceeds a certain value. To take into account the fact here, too, that, as wear occurs, the installation position of the stored-energy element and thus also the base of the release slide can change, the brake element or a part thereof and the release slide form a piston/cylinder unit. This unit has a cylinder chamber, into which fluid is introduced to an extent corresponding to the amount of wear and thus to the axial displacement of the release slide. The relative displacement between the release slide and the section of the braking element working together with the slide to form the piston/cylinder unit, which relative displacement occurs as a result of wear, is ultimately compensated by the increase in the volume of the fluid chamber and the filling of this fluid chamber with fluid. In spite of the displacement of the release slide occurring as a result of wear, therefore, the section of the brake element cooperating with it to form the piston/cylinder unit is held in the same axial installation position, so that, for all succeeding clutch-release operations, a uniform working characteristic can be obtained, at least in the area of the system which provides braking force for the clutch output shaft or transmission input shaft.

SUMMARY OF THE INVENTION

It is the object of the present invention to provide a release system for a clutch assembly which is of simple design and which nevertheless provides a uniform braking characteristic both in the area of the clutch assembly and in the area of the release system itself.

In the release system according to the invention, a latching arrangement includes latching teeth provided on one of the release slide and the brake element, and a latching element provided on the other of the release slide and the brake element. Upon the occurrence of wear, the latching arrangement allows relative movement to occur between the release slide and the brake element, whereas, upon the movement of the release slide in the release direction and the resulting braking interaction between the minimum of one brake element and the counter-brake element, the latching arrangement allows essentially no relative movement between the release slide and the brake element.

As a result of the present invention, a simple mechanical design is provided, in which ultimately the displacements occurring in the area of the clutch assembly—regardless of whether they are caused by wear or manufacturing tolerances—can be compensated easily in the area of the release system or in the part of the system in which the braking force is produced. There is no need to provide any hydraulic devices, as a result of which the arrangement according to the invention can be used especially for clutch systems in which no provisions are made for hydraulic actuation but in which, instead, mechanical actuation is transmitted by means of a Bowden cable or the like.

So that the release system according to the invention can be easily assembled, especially in conjunction with the performance of maintenance work on a vehicle containing one of these systems, it is proposed that the latching element be designed in the form of a latching ring, held on the one component or assembly with essentially no freedom to move in the release direction, which ring can be disengaged from the latching teeth by deforming it in a certain way such as by spreading it open.

A mechanically very simple but still sturdy and reliable design can also be achieved by providing the latching teeth on an outer circumferential area of the minimum of one brake element and by providing the latching element with a latching engagement area, which projects out over an inner circumferential surface of the release slide to engage with the latching teeth.

It is also possible, for example, for the latching ring to be held in an inside circumferential groove in the release slide.

So that the release system according to the invention will be able to adjust itself automatically in the area of the brake section, a motion-limiting device can be provided, which prevents the minimum of one brake element from moving more than a certain distance away from the counter-brake element.

It can be provided, for example, that the motion-limiting device comprises a retaining element, which is or can be attached to a stationary assembly, preferably to the transmission housing, which retaining element acts by way of at least one retaining section on the minimum of one brake element to limit its movement.

To ensure that, during the operation of the clutch in rotational mode, a suitable braking force can be exerted on the transmission input shaft, an antirotational locking system is preferably provided in the arrangement according to the invention, which prevents the minimum of one brake element from rotating.

A simple design requiring only a relatively small number of parts can be obtained by designing the antirotation lock in the form of at least one locking pin, which is provided on the minimum of one brake element. This pin is able to move in the release direction and can thus can engage in a locking recess in the retaining element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
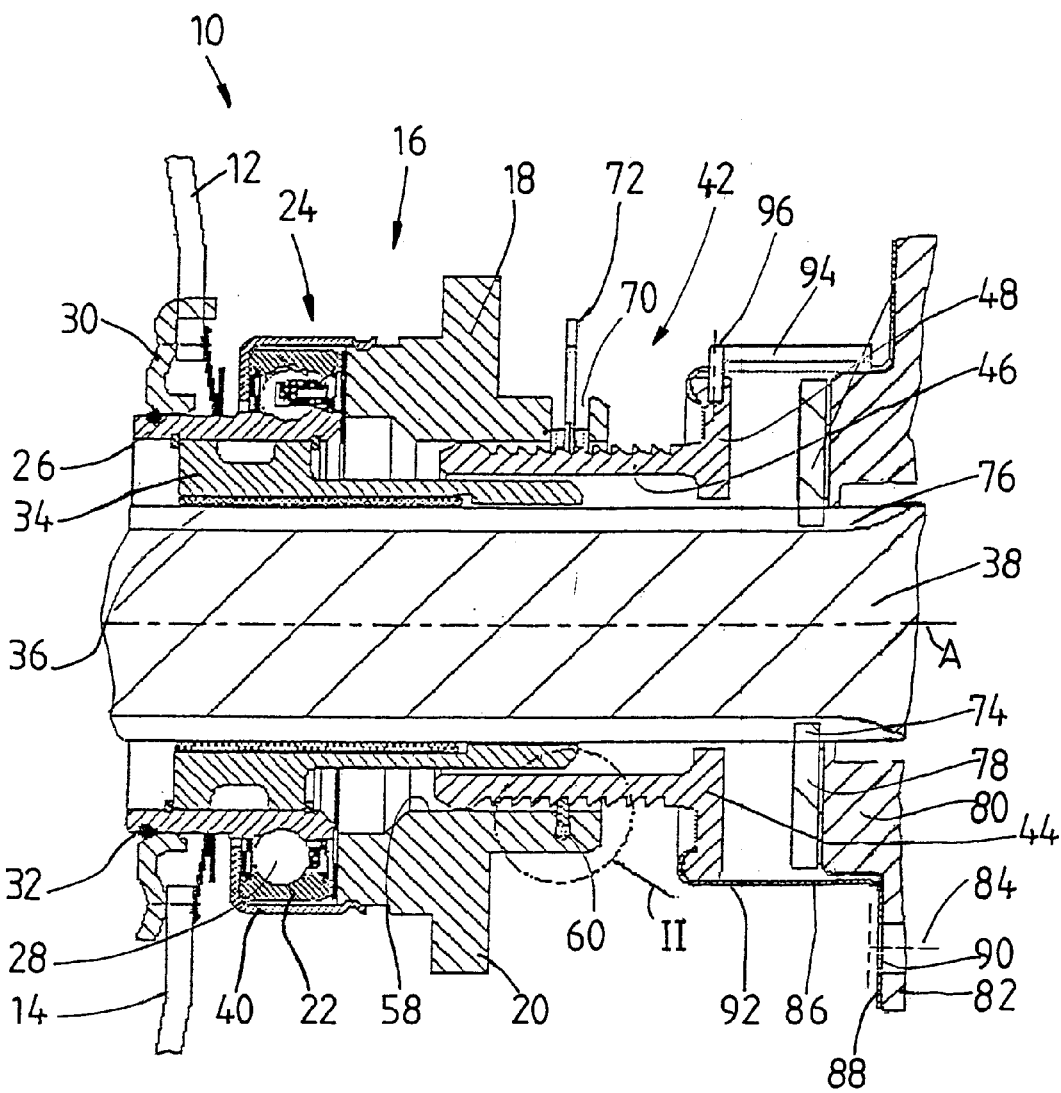
FIG. 1 is a longitudinal section through a release system according to the invention.

In FIG. 1, a release system according to the invention for a clutch assembly is designated 10 overall. This release system 10 is, as generally known, used in the friction clutches of motor vehicles to act on the radially inner area 12 of a stored-energy element 14 visible in FIG. 1 and thus to shift the clutch assembly between an engaged and a disengaged position. In particular, the use of the system in conjunction with a clutch of the pull type is shown in the drawing, in which the clutch is brought into the released state by a pulling type of actuation, that is, by the movement of the radially inner area 12 of the stored-energy element 14 toward the transmission.

The release system 10 comprises a release slide 16. A release fork or the like can act on a flange area 18 of a release ring 20, for example, in order to move the entire release slide 16 toward the right in the diagram of FIG. 1 to execute the release operation. An outer, first bearing ring 22 of a release bearing 24 is connected to the release ring 20. An inner, second bearing ring 26 of the release bearing 24, which is coupled rotatably with the first bearing ring 22 by means of a plurality of rolling elements such as balls 28, engages by way of a driver ring 30 with the radially inner area 12 of the stored-energy element 14. Here, for example, it is possible to provide a locking ring 32, by means of which the driver ring 30 is connected to the second bearing ring 26 for joint motion in the release direction. The second bearing ring 26 can be supported by a support sleeve 34 and possibly a plain bearing element 36 on the clutch output shaft or transmission input shaft 38, ultimately to form as a result the support for the entire release system 16.

It should also be pointed out that the first bearing ring 22 can be rigidly connected by, for example, a locking sleeve 40 to the release ring 20, which sleeve is held in place on the ring by a latching type of connection.

Figure 2:
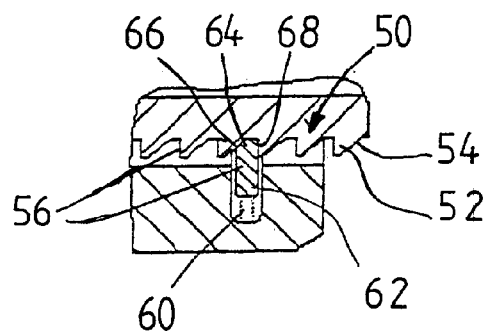
FIG. 2 is an enlarged view of the detail inside circle II in FIG. 1.

The release system 16 according to the invention also has a braking area 42, which, as will be described further below, upon the execution of a release operation, generates a braking force, which decelerates the transmission input shaft 38. This braking area 42 also comprises, for example, a sleeve-like brake element 44 with an essentially cylindrical section 46 and a braking ring section 48, preferably designed as an integral part of the element. On the outer circumferential area of the sleeve section 46, a set of latching teeth 50, shown on a larger scale in FIG. 2, is provided. The latching teeth 50 are designed in such a way that, for example, the individual ring-like latching teeth 52, which extend circumferentially around the rotational axis A of the transmission input shaft 38, have a slanted or ramp-like surface 54 on the side facing away from the stored-energy element 14, and an arresting surface 56, which extends essentially in the radial direction, on the surface facing the stored-energy element 14.

In the area of an inner circumferential surface 58 of the release ring 20, that is, of the release slide 16, a circumferential groove 60, which is open radially toward the inside, is provided. Parts of a latching element in the form of an open latching ring 62 engage in this circumferential groove 60. A latching engagement area 64 of the latching ring 62 projects beyond the inner circumferential surface 58 of the release ring 20 to engage with the latching teeth 50. In this latching area, the latching ring 62 also has a slanted surface 66 on the side facing the stored-energy element 14, and on the side facing away from the stored-energy element 14 it has an essentially radially oriented counter-arresting surface 68. It can be seen in FIG. 2 that, after a latching engagement has been established, the slanted surface 66 of the latching ring 62 rests against a slanted surface 54 of a latching tooth 52, whereas the counter-arresting surface 68 rests against an arresting surface 56 of the immediately adjacent latching tooth 52. A connection essentially fixed in the axial direction between the brake element 44 and the release ring 20, is thus obtained. By designing the latching ring 62 with suitable elasticity and by installing it in such a way that it is preloaded in the radially inward direction against the cylindrical section 46 of the brake element 44, it can be assured that the various components are held securely together.

It can be seen in FIG. 1 that, in a circumferential area of the release ring 20, a radial recess 70 is provided, through which radially outward-bent terminal sections 72 of the latching element 62 can be accessed with a tool. By means of such a tool, the latching ring 62 can be spread apart, and its latching area 64 can thus be disengaged from the latching teeth 50. This is especially advantageous when maintenance procedures are to be performed or when the release system is being removed or installed.

It can also be seen in FIG. 1 that a brake disk 78 is connected to the transmission input shaft 38 by way of appropriate gear teeth arrangements 74, 76 for rotation in common. This brake disk 78 is situated between the brake element 44, i.e., the braking ring section 48 of the braking element 44, and an axially projecting section 80 of a transmission cover 82 or the like. In addition, a retaining sleeve 86 is fastened to the transmission cover 82 by a plurality of schematically suggested fastening screws 84, which, for example, can also attach the transmission cover to the remaining part of a transmission housing. This retaining sleeve 86 has a flange-like section 88, through which the fastening screws 84 can pass to fasten the sleeve. The fastening screws 84 can cooperate with corresponding openings 90 in the retaining sleeve with a bayonet-like effect, so that, by slightly loosening the fastening screws 84 and by turning the retaining sleeve 86, this sleeve 86 can be removed from the transmission cover 82 or, by proceeding in the opposite direction, installed again. In this way, easy access to the brake disk 78 can be obtained without the need to disassemble the entire release system 16. It is especially easy to replace the brake disk 78 if the brake disk 78 consists of two parts. The disk can thus be removed from the transmission input shaft 38 by separating the two parts from each other and reattached to the transmission shaft by putting the two parts back together again.

The retaining sleeve 86 is designed as, for example, a shaped piece of sheet metal and has a retaining section 92 consisting either of a ring-like structure or a set of arms extending around the rotational axis A. This retaining section has hook-like terminal sections, which grip behind the brake element 44 on the side facing away from the transmission. As a result, the brake element 44 cannot move any farther away from the brake disk 78 than the position shown in FIG. 1. In addition, axially oriented recesses 94 are provided at several points on the circumference of the retaining sleeve 86, each recess being open radially toward the inside. An anti-rotation pin 96 on the outside circumferential surface of the brake element 44 fits into each one of these recesses. In this way, it is also ensured that the brake element 44 is prevented from rotating and thus, when it makes frictional contact with the brake disk 78, it cannot rotate jointly with it.

The function of the release system according to the invention is described in the following.

When a clutch-release operation is carried out, the entire release slide 16 is pushed axially toward the right in the diagram of FIG. 1 by the previously described action exerted on the release ring 20. After the release slide 16 has been moved far enough to bring the clutch into its completely released state and then continues to be moved beyond this point, the brake ring section 48 of the brake element 44 arrives in frictional contact with the brake disk 78, presses it against the section 80 of the transmission cover 82. In this state, therefore, in which the clutch has already been completely disengaged, a braking force is exerted on the transmission input shaft 38, which is advantageous especially when downshifting operations are being executed in unsynchronized transmissions. During the following clutch engagement operation, the braking interaction in the brake area 42 is released, and then the frictional interaction in the area of the clutch is restored.

When wear now occurs in the area of the friction clutch, the radially inner area 12 of the stored-energy element 14 moves closer to the drive assembly, which means farther toward the left in FIG. 1. As it moves, the stored-energy element 14 carries the entire release slide 16, that is, the release bearing 24 and the release ring 20, along with it. If the wear is so great that, during this movement, the brake element 44 cannot move any farther away from the transmission as a result of the interaction with the retaining sleeve 86, the slanted surface 66 of the latching element 62 rides up over a slanted surface 54 of the latching tooth 52 involved at that point and latches into the next gap between the teeth. In this way, it is ensured that, in spite of the occurrence of wear, the braking area 42 is always the same functional distance away; that is, the wear-induced change in the installation position of the stored-energy element 14 and the associated displacement of the release slide 16 are ultimately compensated by the latching interaction between the braking element 44 and the release slide 16. Regardless of the amount of wear which has occurred, therefore, the braking characteristic will always remain approximately the same in the area of the brake when a release operation is carried out. This means that the stroke which is required to achieve a braking action, i.e., the stroke which exceeds the release stroke required to disengage the clutch completely remains approximately the same regardless of how much wear has occurred.

The present invention therefore provides a release system of very simple design which makes it possible to compensate for the wear which occurs during operation with respect to the braking force to be produced in the area of the transmission input shaft, so that, regardless of how worn the clutch is, the braking characteristic will always remain the same when clutch-release operations are carried out.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A release system for a clutch assembly having a stored energy element, said system comprising
    a release slide which is connectable to the stored energy element for executing a release movement,
    at least one brake element which, with said release slide, is movable as a unit during execution of a release movement, said at least one brake element being shiftable relative to said release slide to compensate for wear occurring in the clutch assembly,
    a counter-braking element which is nonrotatably connectable to a clutch output shaft, wherein said at least one brake element can press against said counter-braking element, and
    a latching arrangement comprising a set of latching teeth on one of said release slide and said at least one brake element, and a latching element on the other of said release slide and said at least one brake element, said latching teeth cooperating with said latching element to allow relative shifting between said release slide and said brake element when wear occurs in the clutch assembly, and to allow no said relative shifting when the release slide moves in a release direction and said at least one brake element presses against said counter-braking element, wherein said latching element comprises an open latching ring held with essentially no freedom of movement in the release direction with respect to said one of said release slide and said at least one brake element, said latching ring being deformable to release it from said latching teeth.

2. A release system as in claim 1 wherein said at least one brake element has an outer circumferential area, said latching teeth being provided on said outer circumferential area, and said release slide has an inner circumferential surface, said latching element having a latching engagement element area projecting over said inner circumferential surface and engaging said latching teeth.

3. A release system as in claim 2 wherein said release slide has an internal circumferential groove in said inner circumferential surface, said latching element comprising an open latching ring received in said internal groove, said latching ring being releasable from said latching teeth by spreading it apart.

4. A release system as in claim 1 further comprising means for limiting movement of the at least one braking element away from the counter-braking element.

5. A release system as in claim 4 wherein said means for limiting movement comprises a retaining element which can be attached to a stationary assembly, said retaining element having a retaining section which engages said at least one brake element to limit movement of said at least one brake element relative to said stationary assembly.

6. A release system as in claim 1 further comprising an anti-rotation lock which prevents said at least one brake element from rotating.

7. A release system as in claim 5 wherein said means for limiting movement comprises a retaining element which can be attached to a stationary assembly, said retaining element having a retaining section which engages said at least one brake element to limit movement of said at least one brake element relative to said stationary assembly, and a locking recess, said anti-rotation lock comprising at least one locking pin provided on said at least one brake element and engaging in said locking recess.

* * * * *